(No Model.)
E. P. USHER.
STORAGE BATTERY.
No. 509,270. Patented Nov. 21, 1893.
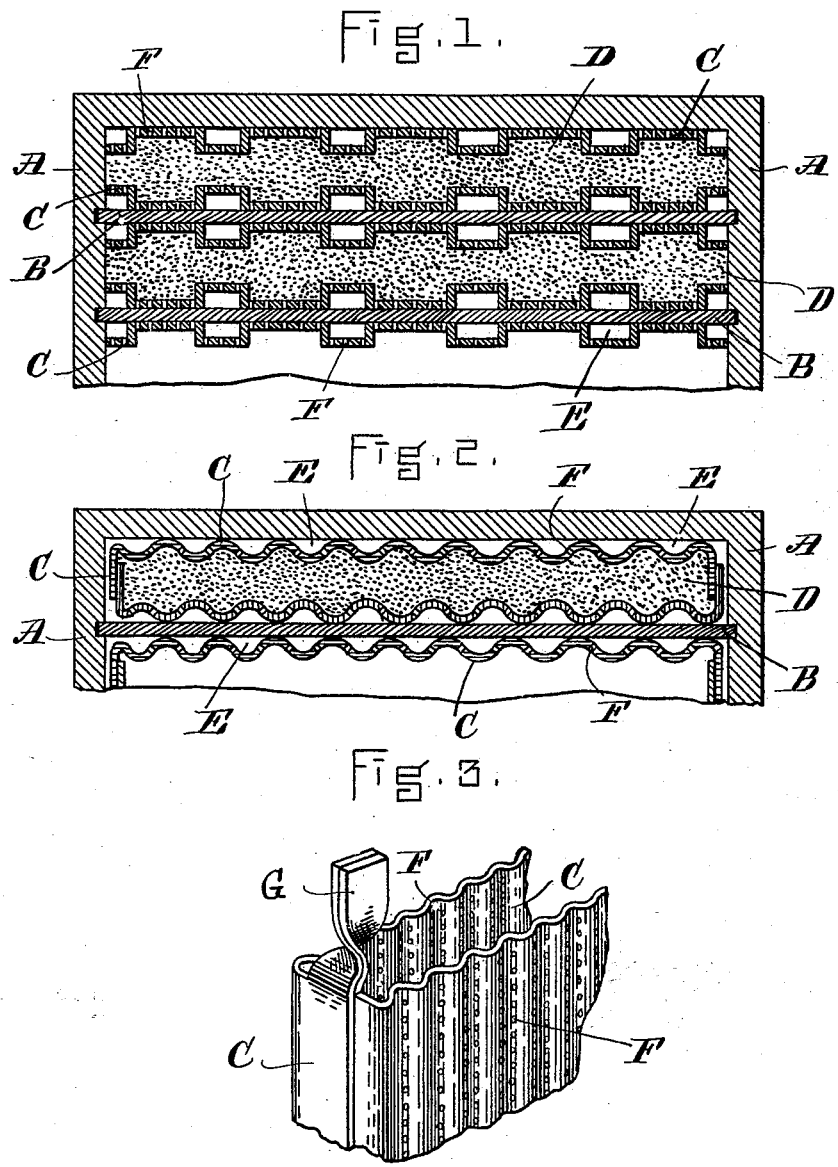

UNITED STATES PATENT OFFICE.

EDWARD P. USHER, OF GRAFTON, MASSACHUSETTS, ASSIGNOR TO THE HOPEDALE ELECTRIC COMPANY OF WEST VIRGINIA, OF WEST VIRGINIA.

STORAGE-BATTERY.

SPECIFICATION forming part of Letters Patent No. 509,270, dated November 21, 1893.

Application filed January 23, 1893. Serial No. 459,477. (No model.)

*To all whom it may concern:*

Be it known that I, EDWARD P. USHER, of Grafton, in the county of Worcester and State of Massachusetts, have invented certain new and useful Improvements in Storage-Batteries, of which the following, taken in connection with the accompanying drawings, is a specification.

This invention relates to storage battery plates formed of corrugated conducting metallic side-walls finely perforated, with a filling of active material inclosed between them, and exposed to the action of the acid by means of the perforations, separators being used to prevent contact of adjacent plates in the use of the battery.

My invention consists in perforated and corrugated conducting sheets, preferably of thin metallic sheet lead forming side-walls of the plate, and a body of active material between them, the corrugations, bends or waves extending vertically, in combination with a wooden or other porous vertical separator interposed between successive plates. The vertical edges of the separator fit into grooves in the sides of the box or case, thus preventing the material in one compartment from contact with the plate in the next. The corrugated side-walls promote circulation of the acid and provide vertical wells or spaces between the leaden sheet and the separator. A filling of active material is introduced into the space between the sheets of each plate, peferably in the form of a dry powder, which, when the plate is formed, becomes a cake or tablet. The corrugations will be zigzag, angular or curved bends of more or less extent, and any desired fineness, and the entire surface may be of perforated material if preferred. The upper edges of the two sheets forming the side walls of each plate will be united together at one end by the connecting lug in any suitable manner.

In the drawings, Figures 1 and 2 are horizontal sections through packed plates and separators inclosed in a suitable case and embodying my invention. Fig. 3 is a partial perspective view of the corrugated and perforated sheets forming walls of such a plate and illustrating the connecting lug by which they are united.

A represents the case or jar in which a suitable series of plates are inclosed.

B B are the porous separators set in vertical grooves of the case, each plate thus having a compartment to itself.

C C are the sides of each plate, such sides being leaden or other conducting sheets perforated throughout or at intervals and corrugated vertically. These sheets or sides rest against the end wall of the jar and the successive separators, with a space between the sheets for the reception of a filling of material to become active. This material D, in powdered form, is introduced dry into these spaces, and the acid, rising in the vertical wells E of the corrugations, enters gradually through the perforations F. A coating of thick mucilage will suffice to prevent premature escape of the powder through the perforations. The acid cuts away this coating as soon as it is exposed.

As shown in Fig. 1 the case A forms or closes the ends of the spaces between the side sheets of each plate. The sheets may however be bent inwardly to form metallic ends, as in Fig. 2, and these ends lapped and joined may extend upwardly to constitute the connecting lug G by which the several sheets of a series are united to the cross-bar.

Fig. 3 represents an end connection or lug well adapted to be united to the transverse bar.

I claim as my invention—

In a secondary battery, a cell divided into compartments by porous, non-conducting separators, in combination with electrodes in said compartments each consisting of two sheets of conducting material perforated and vertically corrugated, with a continuous layer of lead oxide confined between said sheets, leaving the outside vertical spaces between such sheets and the adjacent separators clear and open, substantially as set forth.

In testimony whereof I have signed my name to this specification, in the presence of two subscribing witnesses, on this 21st day of January, A. D. 1893.

EDWARD P. USHER.

Witnesses:
A. H. SPENCER,
THOMAS J. KENNY.